US012687144B2

(12) United States Patent
Matsuzaki et al.

(10) Patent No.: US 12,687,144 B2
(45) Date of Patent: Jul. 21, 2026

(54) VEHICLE CONTROL APPARATUS

(71) Applicant: SUBARU CORPORATION, Tokyo (JP)

(72) Inventors: Tetsu Matsuzaki, Tokyo (JP); Akihiro Kawakami, Tokyo (JP); Yusuke Inokuchi, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 46 days.

(21) Appl. No.: 19/045,627

(22) Filed: Feb. 5, 2025

(65) Prior Publication Data

US 2025/0297590 A1 Sep. 25, 2025

(30) Foreign Application Priority Data

Mar. 21, 2024 (JP) ................................. 2024-044363

(51) Int. Cl.
| | |
|---|---|
| *F02N 11/08* | (2006.01) |
| *B60K 6/442* | (2007.10) |
| *F16H 45/02* | (2006.01) |
| *B60K 6/48* | (2007.10) |
| *F16H 45/00* | (2006.01) |

(52) U.S. Cl.
CPC .......... *F02N 11/0851* (2013.01); *B60K 6/442* (2013.01); *F02N 11/0803* (2013.01); *F16H 45/02* (2013.01); *B60K 6/48* (2013.01); *B60Y 2200/92* (2013.01); *F02N 2200/0801* (2013.01); *F16H 2045/005* (2013.01); *F16H 2045/0215* (2013.01)

(58) Field of Classification Search
CPC ............. F02N 11/0851; F02N 11/0803; F02N 2200/92; B60K 6/442; B60K 6/48; F16H 45/02; F16H 2045/005; F16H 2045/0215; B60Y 2200/92
See application file for complete search history.

(56) References Cited

U.S. PATENT DOCUMENTS

| | | | |
|---|---|---|---|
| 9,127,765 B2 | 9/2015 | Eto et al. | |
| 10,584,789 B2 * | 3/2020 | Toyota ................ | F16H 61/0031 |

(Continued)

FOREIGN PATENT DOCUMENTS

| | | |
|---|---|---|
| JP | 2013-217271 A | 10/2013 |
| JP | 2018-167738 A | 11/2018 |
| WO | 2013/054409 A1 | 4/2013 |

*Primary Examiner* — Syed O Hasan
(74) *Attorney, Agent, or Firm* — Rimon P.C.

(57) ABSTRACT

A vehicle control apparatus includes a lock-up control valve that controls a lock-up piston and a control system. A spool valve stem of the rock-up control valve is configured to move to an engagement position where working fluid is supplied to an apply oil path, a disengagement position where the working fluid is supplied to a release oil path, and the intermediate position. The control system is configured to perform a first starting control in which an engine is cranked in a state where the spool valve stem is held at the intermediate position and the clutch is engaged. The control system is configured to perform, when a start of the engine by the first starting control fails, a second starting control in which the engine is cranked in a state where the spool valve stem is moved to the disengagement position and the clutch is engaged.

4 Claims, 11 Drawing Sheets

(56) References Cited

U.S. PATENT DOCUMENTS

| | | | |
|---|---|---|---|
| 2015/0025739 A1* | 1/2015 | Wakairo | F16H 61/0025 |
| | | | 701/36 |
| 2016/0146338 A1* | 5/2016 | Ogata | F16H 61/0031 |
| | | | 137/565.13 |
| 2017/0210315 A1* | 7/2017 | Nakajima | F16N 7/385 |
| 2022/0111719 A1* | 4/2022 | Matsubara | B60K 6/26 |

* cited by examiner

VEHICLE CONTROL APPARATUS

CROSS-REFERENCE TO RELATED APPLICATIONS

The present application claims priority from Japanese Patent Application No. 2024-044363 filed on Mar. 21, 2024, the entire contents of which are hereby incorporated by reference.

BACKGROUND

The disclosure relates to a vehicle control apparatus. A torque converter coupled to an engine includes a lock-up clutch directly coupling a crankshaft and a turbine shaft (refer to International Patent Application Publication WO 2013/054409, Japanese Unexamined Patent Application Publication (JP-A) No. 2013-217271, and JP-A No. 2018-167738). The lock-up clutch is controlled to be in an engaged state by supplying working fluid to an apply chamber and discharging working fluid from a release chamber in the torque converter. On the other hand, the lock-up clutch is controlled to be in a disengaged state by supplying working fluid to the release chamber and discharging working fluid from the apply chamber in the torque converter.

SUMMARY

According to the disclosure, a vehicle control apparatus includes an engine coupled to wheels via a power transmission path and a clutch provided in the power transmission path. The vehicle control apparatus includes a torque converter provided in the power transmission path and disposed between the engine and the clutch. The vehicle control apparatus includes a lock-up piston contained in a case of the torque converter and configured to define an apply chamber and a release chamber in the case. The vehicle control apparatus includes a lock-up control valve coupled to the apply chamber via an apply oil path and coupled to the release chamber via a release oil path. The vehicle control apparatus includes a control system including a processor and a memory coupled so as to be communicable with each other. A spool valve stem of the lock-up control valve is configured to move to an engagement position where working fluid is supplied to the apply oil path and the working fluid is discharged from the release oil path, a disengagement position where the working fluid is supplied to the release oil path and the working fluid is discharged from the apply oil path, and an intermediate position located between the engagement position and the disengagement position. The control system is configured to, when a starting condition of the engine is satisfied in a state where the spool valve stem is moved to the intermediate position and the clutch is engaged, perform a first starting control in which the engine is cranked in a state where the spool valve stem is held at the intermediate position and the clutch is engaged. The control system is configured to, when a start of the engine by the first starting control fails, perform a second starting control in which the engine is cranked in a state where the spool valve stem is moved to the disengagement position and the clutch is engaged.

DETAILED DESCRIPTION

In order to reduce the consumption of working fluid by the torque converter, the lock-up clutch may be controlled to be in a neutral state between an engaged state and a disengaged state. When the lock-up clutch is controlled to be in the neutral state in this way, the torque capacity of the lock-up clutch is controlled to almost "0", so it is possible to crank the engine while controlling the lock-up clutch to be in the neutral state. However, when the lock-up clutch is not appropriately controlled to be in the neutral state, the cranking rotating speed may not be increased sufficiently, which may make it difficult to start the engine. Thus, there is a demand to start the engine even in a situation where the lock-up clutch is not appropriately controlled.

Hereinafter, an embodiment of the disclosure will be described in detail with reference to drawings. In the following descriptions, the same or substantially same components and elements are denoted by the same reference signs and repetitive descriptions are omitted.

Outline of Vehicle Control Apparatus

Figure 1:
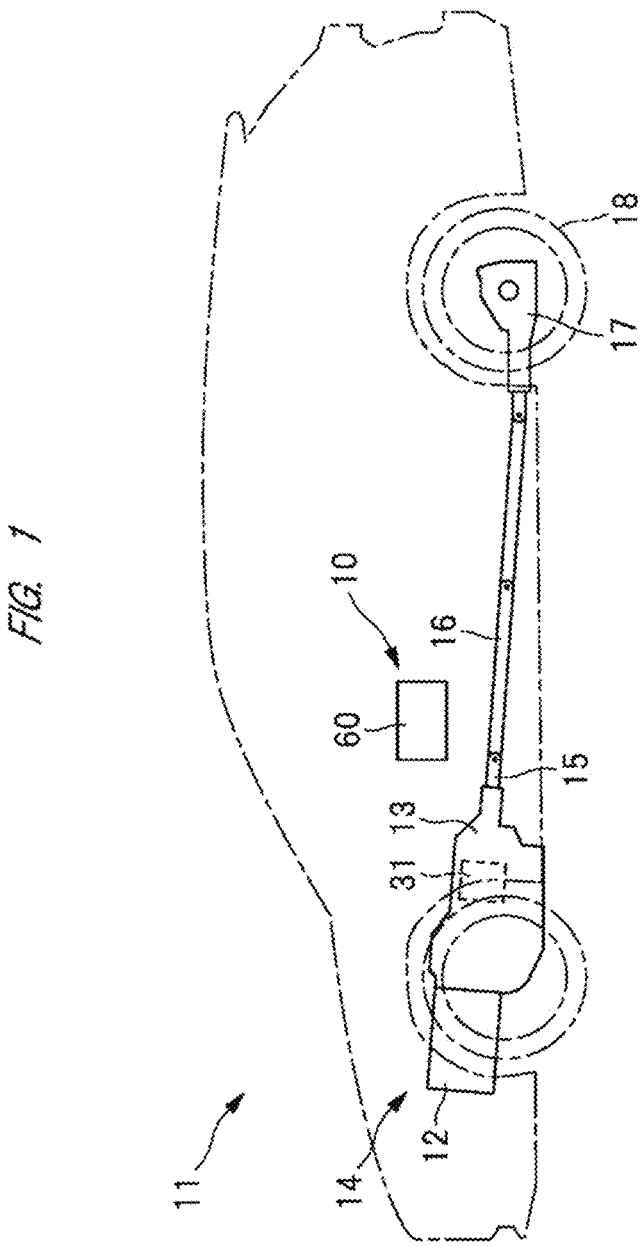
FIG. 1 is a diagram illustrating a vehicle including a vehicle control apparatus according to an embodiment of the disclosure.

FIG. 1 is a diagram illustrating a vehicle 11 including a vehicle control apparatus 10 according to an embodiment of the disclosure. As illustrated in FIG. 1, the vehicle 11 includes a power unit 14 including an engine 12 and a transmission 13. An output shaft 15 of the power unit 14 is coupled to wheels 18 via a propeller shaft 16 and a differential mechanism 17. Note that the illustrated vehicle 11 is a rear-wheel drive vehicle, but is not limited to this and may be an all-wheel drive vehicle or a front-wheel drive vehicle.

Figure 2:
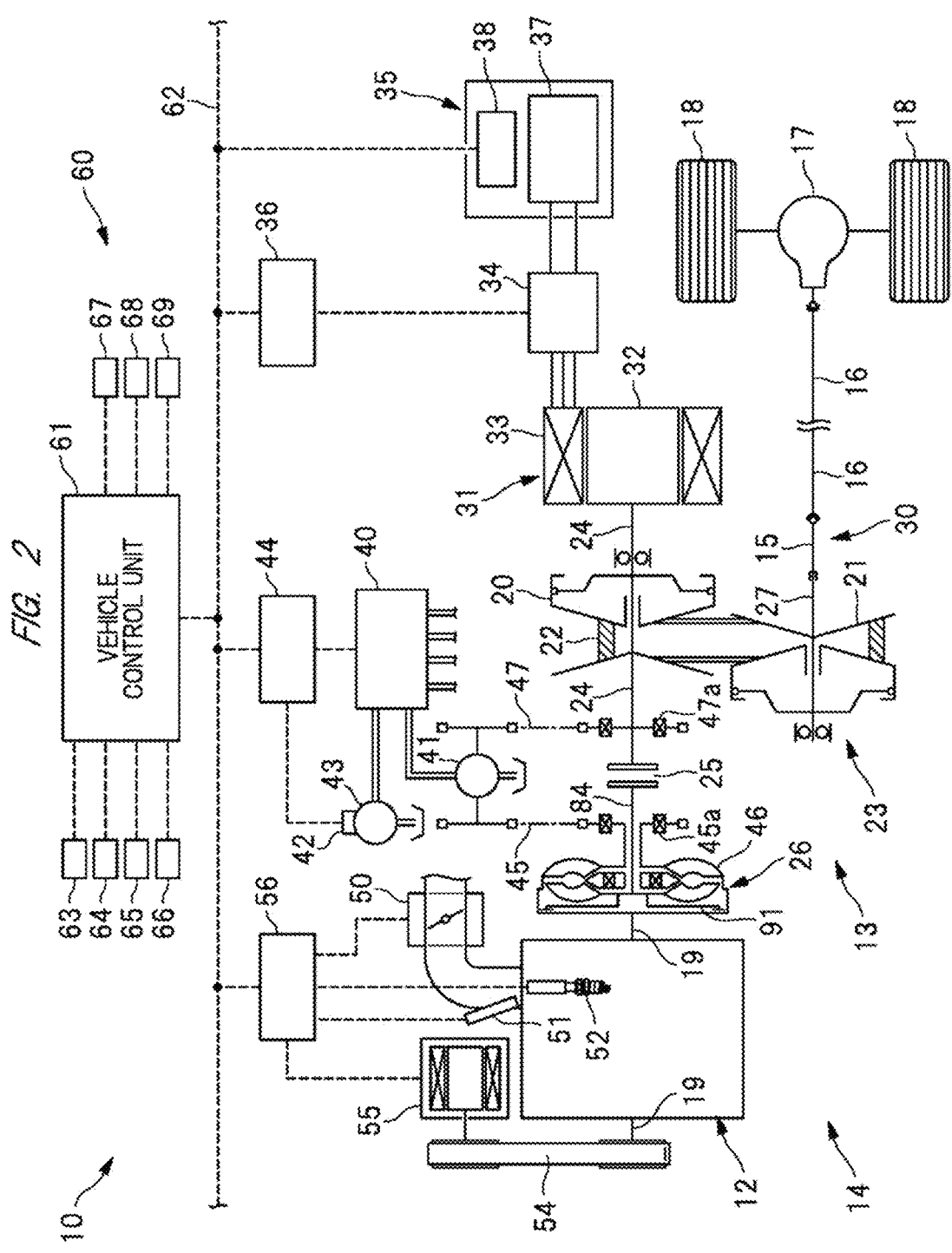
FIG. 2 is a diagram illustrating a configuration example of the vehicle control apparatus.

FIG. 2 is a diagram illustrating a configuration example of the vehicle control apparatus 10. As illustrated in FIG. 2, the transmission 13 of the power unit 14 includes a continuously variable transmission mechanism 23 including a primary pulley 20, a secondary pulley 21, and a drive chain 22. The engine 12 is coupled to a primary shaft 24 supporting the primary pulley 20 via an input clutch (clutch) 25 and a torque converter 26. The wheels 18 are coupled to a secondary shaft 27 supporting the secondary pulley 21 via the output shaft 15, the propeller shaft 16, and the differential mechanism 17. Note that the input clutch 25 is a hydraulic clutch that constitutes a part of a forward-backward travel changeover mechanism including, for example, a planetary gear train, and is a clutch to be engaged when the vehicle 11 is driven forward.

A crankshaft 19 of the engine 12 is coupled to the wheels 18 via a power transmission path 30 including the torque converter 26, the continuously variable transmission mechanism 23, and others. The power transmission path 30 includes the torque converter 26 and the input clutch 25, and the torque converter 26 is disposed between the engine 12 and the input clutch 25. In the configuration example illustrated in FIG. 2, the power transmission path 30 includes the crankshaft 19, the torque converter 26, a turbine shaft 84, the input clutch 25, the primary shaft 24, the continuously variable transmission mechanism 23, the secondary shaft 27, the output shaft 15, the propeller shaft 16, the differential mechanism 17, and others.

A rotor 32 of a motor generator (driving motor) 31 is coupled to the primary shaft 24. In other words, the motor generator 31 is coupled to the wheels 18 via the power transmission path 30 including the continuously variable transmission mechanism 23. A battery pack 35 is coupled to a stator 33 of the motor generator 31 via an inverter 34. In order to control unillustrated switching elements in the inverter 34, a motor control unit 36 serving as an electronic control unit is coupled to the inverter 34. The motor control unit 36 serves to control the motor torque and motor speed by controlling an energizing state of the stator 33 via the inverter 34. The battery pack 35 includes a battery module 37 including unillustrated multiple battery cells and a battery control unit 38 serving as an electronic control unit. The battery control unit 38 serves to monitor the charging and discharging of the battery module 37.

A valve unit 40 including electromagnetic valves, oil paths, and others is provided in the power unit 14. An oil pump 41 driven by the engine 12 and the primary shaft 24 and an oil pump 43 driven by an electric motor 42 are provided in the power unit 14. Working fluid ejected from the oil pumps 41 and 43 is controlled by the valve unit 40 in terms of supply destination, pressure, and others, and is supplied to the input clutch 25, the continuously variable transmission mechanism 23, and others. A transmission control unit 44 serving as an electronic control unit is coupled to the valve unit 40 and the electric motor 42 so as to control the operating state of the valve unit 40 and the electric motor 42.

Note that the oil pump 41 is coupled to a pump shell 46 of the torque converter 26 via a chain mechanism 45 including a one-way clutch 45a. Also, the oil pump 41 is coupled to the primary shaft 24 via a chain mechanism 47 including a one-way clutch 47a. When the engine 12 is in operation, the driving force is transmitted from the pump shell 46 to the oil pump 41 via the chain mechanism 45. On the other hand, even if the engine 12 is stopped, when the primary shaft 24 is rotating, the driving force is transmitted from the primary shaft 24 to the oil pump 41 via the chain mechanism 47. Further, when the engine 12 is stopped and the rotation speed of the primary shaft 24 is low, the oil pump 43 is driven by the electric motor 42.

The engine 12 includes a throttle valve 50 that adjusts the amount of intake air, an injector 51 that injects fuel, and an ignition device 52 that ignites the air-fuel mixture in a cylinder. A starter generator 55 is coupled to the crankshaft 19 of the engine 12 via a belt mechanism 54. The starter generator 55 is a so-called integrated starter generator (ISG) that serves as both an electric generator and an electric motor. In other words, the starter generator 55 not only serves as an electric generator that is driven to rotate by the crankshaft 19 to generate electricity, but also serves as an electric motor that drives the crankshaft 19 to rotate. For example, when a starting condition described later is satisfied and the engine 12 is to be started, the engine 12 is cranked by the starter generator 55. An engine control unit 56 serving as an electronic control unit is coupled to the throttle valve 50, the injector 51, the ignition device 52, and the starter generator 55.

Control System

As illustrated in FIG. 2, the vehicle control apparatus 10 includes a control system 60 including multiple electronic control units. The vehicle control apparatus 10 includes, as electronic control units constituting the control system 60, the motor control unit 36, the battery control unit 38, the transmission control unit 44, and the engine control unit 56 described above and further includes a vehicle control unit 61 that outputs control signals to the control units 36, 38, 44, and 56. These control units 36, 38, 44, 56, and 61 are coupled so as to be communicable with each other via an in-vehicle network 62. The vehicle control unit 61 sets an operation target of the power unit 14 based on input information from the control units 36, 38, 44, and 56 and various sensors described below. Also, the vehicle control unit 61 generates control signals according to the operation target of the power unit 14 and outputs these control signals to the engine control unit 56, the transmission control unit 44, and others.

A vehicle speed sensor 63 that detects the vehicle speed corresponding to the traveling speed of the vehicle 11, an accelerator sensor 64 that detects the accelerator opening corresponding to the amount of operation of an accelerator pedal, and a brake sensor 65 that detects the amount of operation of a brake pedal are coupled to the vehicle control unit 61. Also, an engine rotation sensor 66 that detects the engine rotation speed corresponding to the rotation speed of the crankshaft 19 and a turbine rotation sensor 67 that detects the turbine rotation speed corresponding to the rotation speed of the turbine shaft 84 are coupled to the vehicle control unit 61. Furthermore, a power switch 68 that performs starting and stopping operations of the control system 60 and a warning light 69 provided on an unillustrated meter panel or the like are coupled to the vehicle control unit 61.

Figure 3:
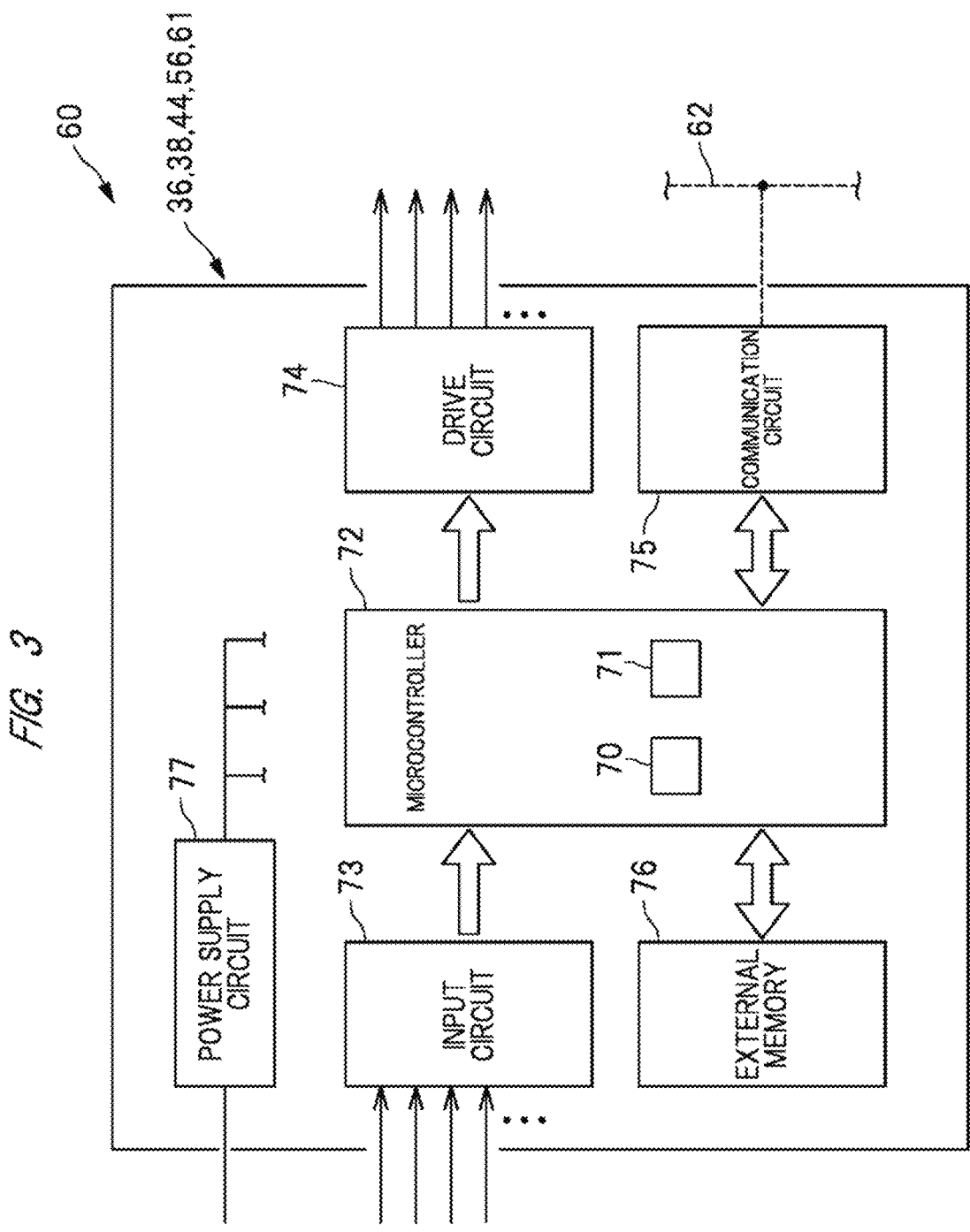
FIG. 3 is a diagram illustrating an example of a basic structure of an electronic control unit.

FIG. 3 is a diagram illustrating an example of a basic structure of the electronic control units 36, 38, 44, 56, and 61. As illustrated in FIG. 3, each of the electronic control units 36, 38, 44, 56, and 61 includes a microcontroller 72 incorporating a processor 70, a main memory 71, and others. A predetermined program is stored in the main memory 71, and the program is executed by the processor 70. The processor 70 and the main memory 71 are coupled so as to be communicable with each other. Note that the microcontroller 72 may incorporate multiple processors 70, and the microcontroller 72 may incorporate multiple main memories 71.

Also, each of the electronic control units 36, 38, 44, 56, and 61 includes an input circuit 73, a drive circuit 74, a communication circuit 75, an external memory 76, and a power supply circuit 77. The input circuit 73 converts signals input from various sensors into signals that can be input to the microcontroller 72. The drive circuit 74 generates drive signals for devices such as the valve unit 40 and others described above based on signals output from the microcontroller 72. The communication circuit 75 converts signals output from the microcontroller 72 into communication signals directed to other electronic control units and others. The communication circuit 75 converts communication signals received from other electronic control units and others into signals that can be input to the microcontroller 72. The power supply circuit 77 supplies a stable power supply voltage to the microcontroller 72, the input circuit 73, the drive circuit 74, the communication circuit 75, the external memory 76, and others. The external memory 76 including a non-volatile memory and others stores programs, various data, and others.

Driving Mode

Figure 4A:
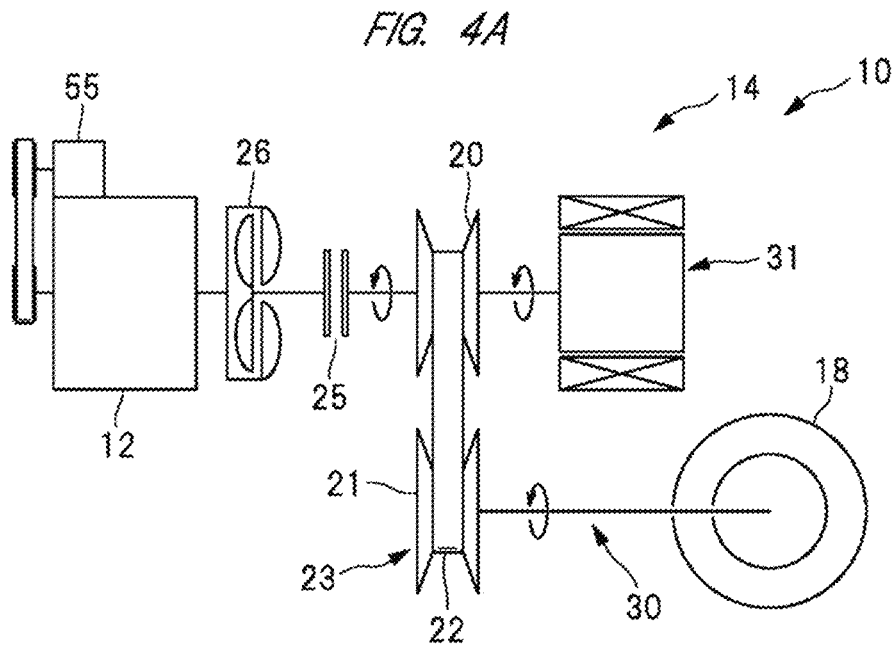
FIG. 4A is a diagram illustrating a power unit when an EV mode is executed.
Figure 4B:
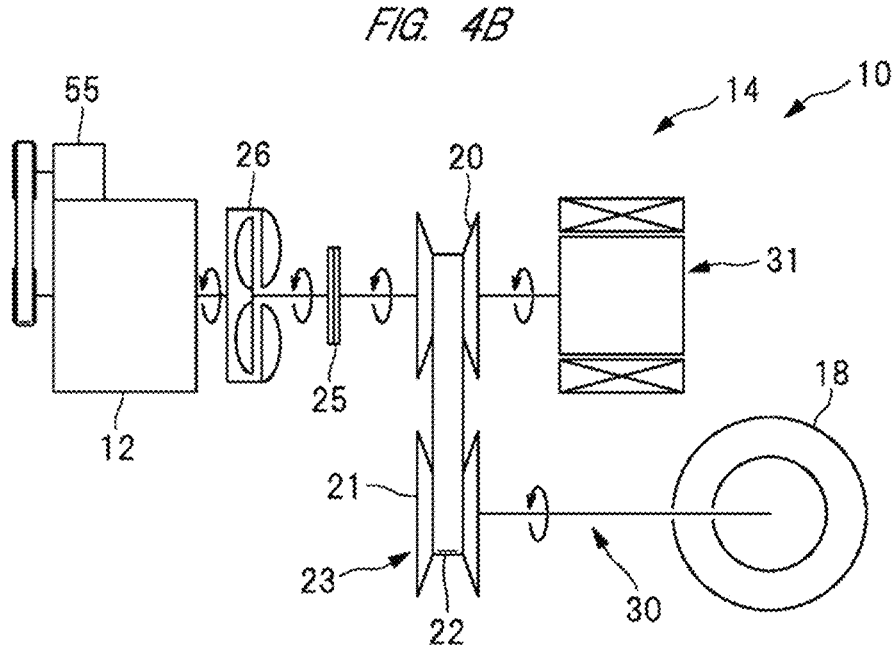
FIG. 4B is a diagram illustrating the power unit when an HEV mode is executed.

FIG. 4A is a diagram illustrating the power unit 14 when an EV mode is executed, and FIG. 4B is a diagram illustrating the power unit 14 when an HEV mode is executed. The vehicle 11 has two driving modes such as an electric vehicle (EV) mode and a hybrid electric vehicle (HEV) mode. The EV mode is a driving mode in which the input clutch 25 is disengaged to drive the motor generator 31, and the HEV mode is a driving mode in which the input clutch 25 is engaged to drive the engine 12 and the motor generator 31.

As illustrated in FIG. 4A, when the EV mode is executed, the input clutch 25 is controlled to be in a disengaged state, the engine 12 is controlled to be in a stopped state, and the motor generator 31 is controlled to be in a powering state. This allows the motor torque to be transmitted to the wheels 18, and the vehicle 11 can be driven using the motor generator 31. When the vehicle 11 is decelerated, the motor generator 31 is controlled to be in a regeneration state, that is, in a power generation state.

As illustrated in FIG. 4B, when the HEV mode is executed, the input clutch 25 is controlled to be in an engaged state, the engine 12 is controlled to be in an operating state, and the motor generator 31 is controlled to be in a powering state. This allows the engine torque and the motor torque to be transmitted to the wheels 18, and the vehicle 11 can be driven using the engine 12 and the motor generator 31. Note that the motor generator 31 may be controlled to be in an idling state or a regeneration state depending on the driving conditions.

Figure 5:
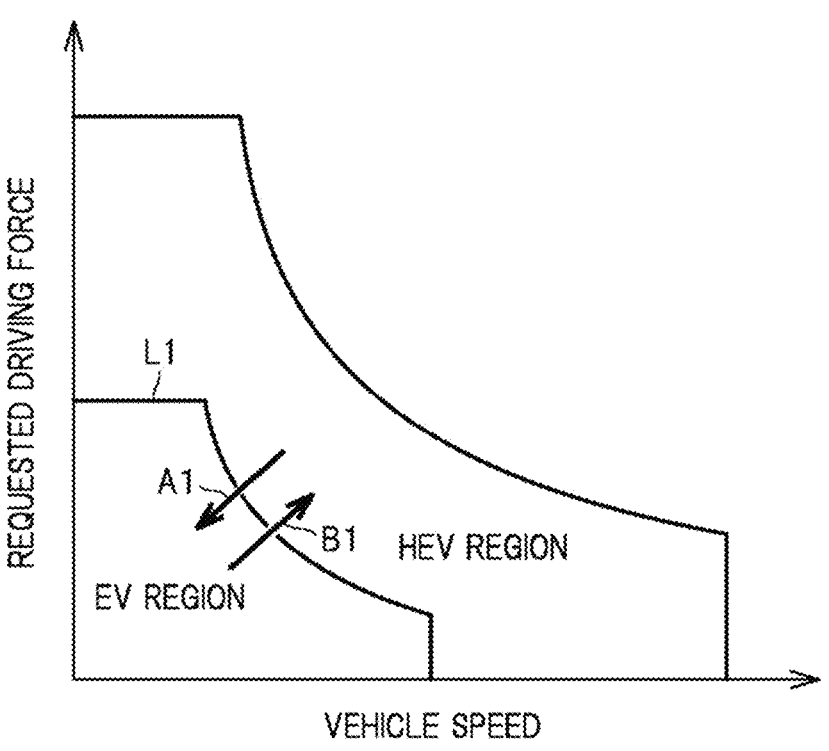
FIG. 5 is a diagram illustrating an example of execution regions of the EV mode and the HEV mode.

FIG. 5 is a diagram illustrating an example of execution regions of the EV mode and the HEV mode. As illustrated in FIG. 5, a boundary line L1 that defines an EV region where the EV mode is executed and an HEV region where the HEV mode is executed is set between the EV region and the HEV region. Note that a requested driving force illustrated in FIG. 5 is the driving force requested of the power unit 14 by the control system 60. The control system 60 can calculate the requested driving force based on the accelerator opening. For example, the control system 60 calculates the requested driving force to be larger as the accelerator opening increases, and calculates the requested driving force to be smaller as the accelerator opening decreases.

As indicated by an arrow Al in FIG. 5, when the requested driving force or vehicle speed decreases during the HEV mode and the driving state falls below the boundary line L1 from the HEV region, the control system 60 determines to transition from the HEV mode to the EV mode. Then, the control system 60 switches the driving mode from the HEV mode to the EV mode by disengaging the input clutch 25 and stopping the engine 12. On the other hand, as indicated by an arrow B1 in FIG. 5, when the requested driving force or vehicle speed increases during the EV mode and the driving state exceeds the boundary line L1 from the EV region, the control system 60 determines to transition from the EV mode to the HEV mode.

Then, the control system 60 switches the driving mode from the EV mode to the HEV mode by starting the engine 12 and engaging the input clutch 25. As described above, the increase in the requested driving force exceeding the boundary line L1 or the increase in the vehicle speed exceeding the boundary line L1 corresponds to a mode switching request from the EV mode to the HEV mode, that is, a starting condition of the engine 12.

Torque Converter

Figure 6:
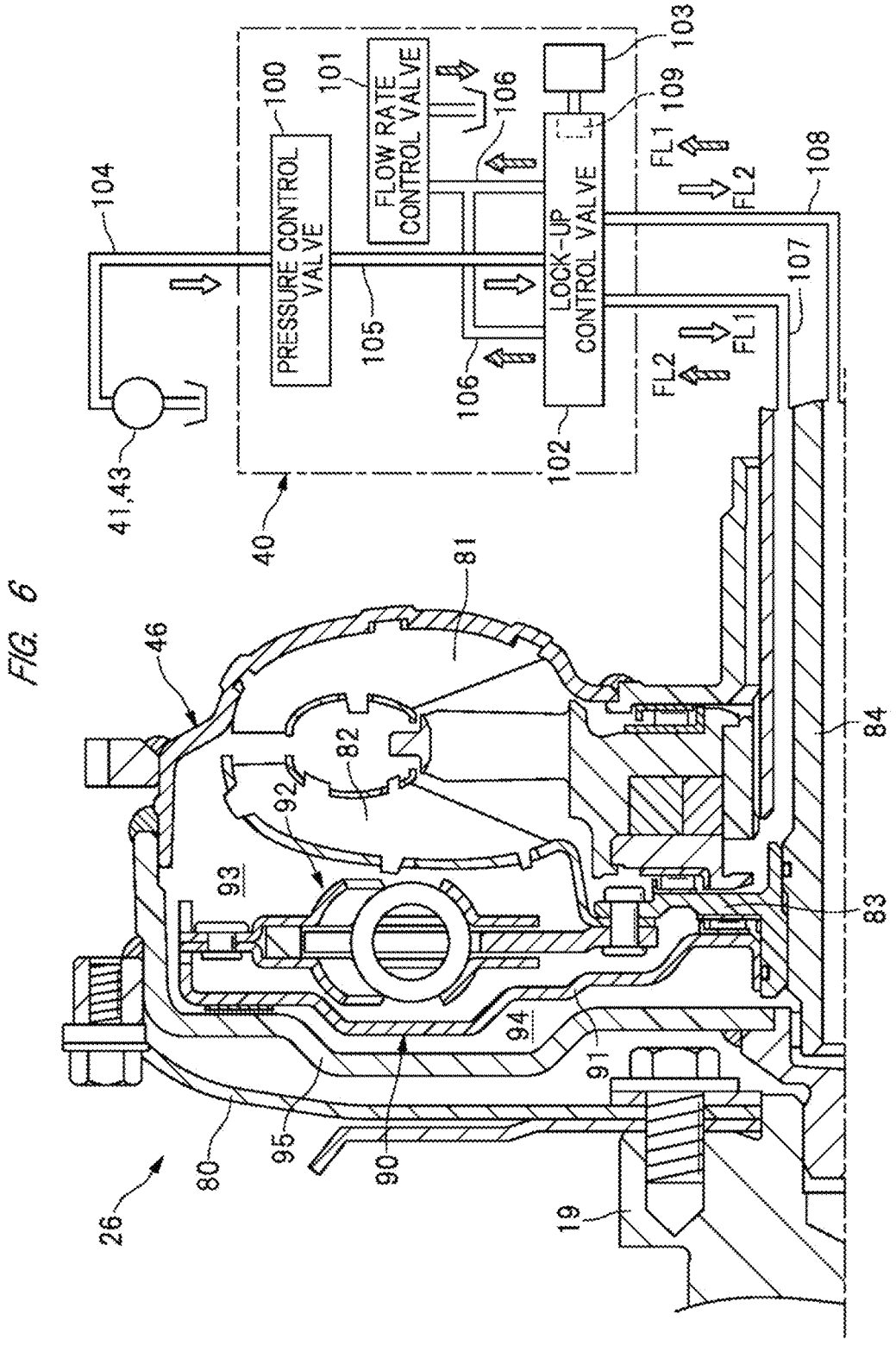
FIG. 6 is a diagram illustrating a part of a torque converter and a bulb unit.

FIG. 6 is a diagram illustrating a part of the torque converter 26 and the valve unit 40. As illustrated in FIG. 6, the torque converter 26 includes the pump shell 46 coupled to the crankshaft 19 of the engine 12 via a drive plate 80. Also, the torque converter 26 includes a pump impeller 81 fixed to the pump shell 46 and a turbine runner 82 facing the pump impeller 81. The turbine shaft 84 is coupled to the turbine runner 82 via a turbine hub 83. Working fluid is supplied to the torque converter 26, and engine torque is transmitted from the pump impeller 81 to the turbine runner 82 via the working fluid.

The torque converter 26 includes a lock-up clutch 90 that directly couples the crankshaft 19 and the turbine shaft 84. The lock-up clutch 90 includes a lock-up piston 91 contained in the pump shell (case) 46. The lock-up piston 91 is coupled to the turbine hub 83 via a damper mechanism 92. As illustrated in the figure, the lock-up piston 91 is contained in the pump shell 46, and an apply chamber 93 and a release chamber 94 are defined in the pump shell 46. In other words, the lock-up piston 91 serving as the boundary partitions the inside of the pump shell 46 into the apply chamber 93 defined on the side with the turbine runner 82 and the release chamber 94 defined on the side with a front cover 95 of the pump shell 46.

The valve unit 40 is coupled to the torque converter 26 in order to supply working fluid to the apply chamber 93 and the release chamber 94. The valve unit 40 includes a pressure control valve 100, a flow rate control valve 101, a lock-up control valve 102, and a duty control valve 103. The oil pumps 41 and 43 and the pressure control valve 100 are coupled via a pump oil path 104, and the working fluid ejected from the oil pumps 41 and 43 is supplied to the pressure control valve 100 via the pump oil path 104. The pressure control valve 100 and the lock-up control valve 102 are coupled via a supply oil path 105, and the working fluid output from the pressure control valve 100 is supplied to the lock-up control valve 102 via the supply oil path 105. The lock-up control valve 102 and the flow rate control valve 101 are coupled via a discharge oil path 106, and the working fluid discharged from the pressure control valve 100 is supplied to the flow rate control valve 101 via the discharge oil path 106.

The lock-up control valve 102 is coupled to the apply chamber 93 via an apply oil path 107, and is coupled to the release chamber 94 via a release oil path 108. In order to control the operating state of the lock-up control valve 102 serving as an oil path switching valve, the duty control valve 103 is coupled to a pilot chamber 109 of the lock-up control valve 102. As will be described later, the control system 60 controls the duty ratio of the duty control valve 103 to adjust the pilot pressure supplied to the pilot chamber 109, thereby controlling the operating state of the lock-up control valve 102.

Lock-Up Control Valve

Figure 7A:
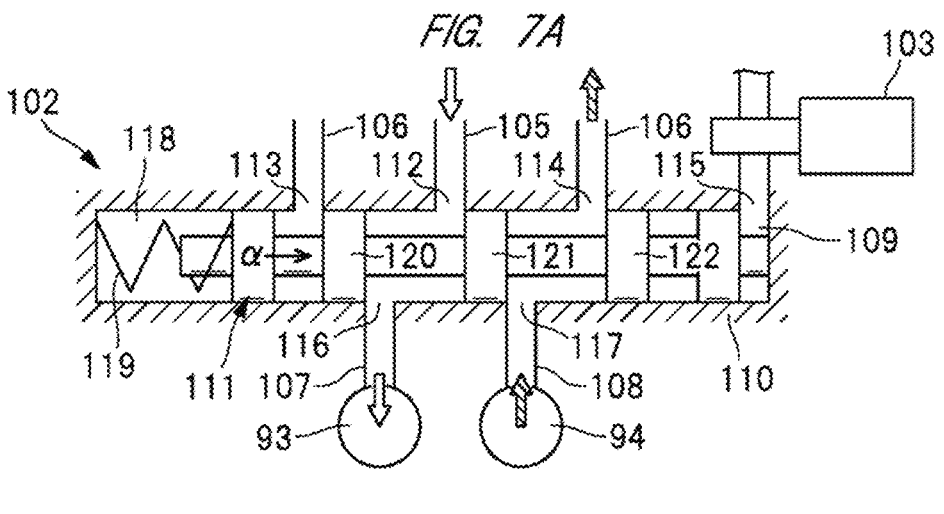
FIG. 7A is a diagram illustrating an operating state of a lock-up control valve.
Figure 7B:
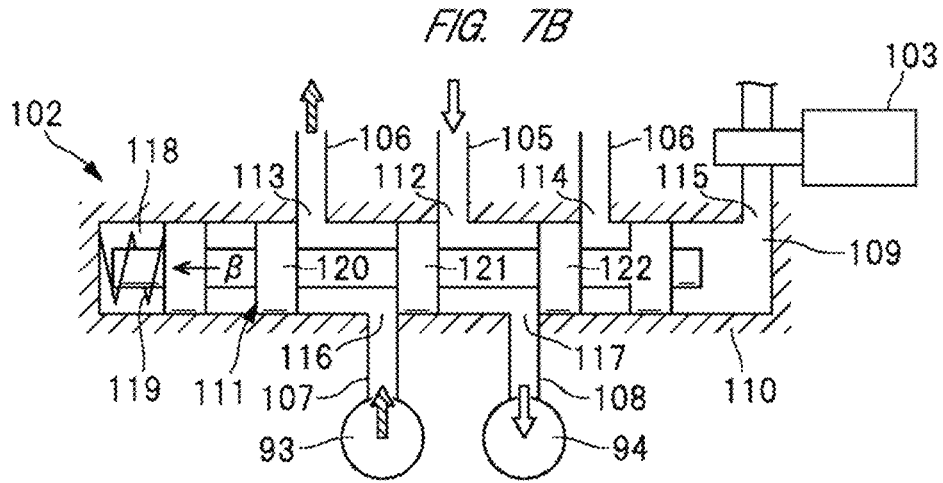
FIG. 7B is a diagram illustrating the operating state of the lock-up control valve.
Figure 7C:
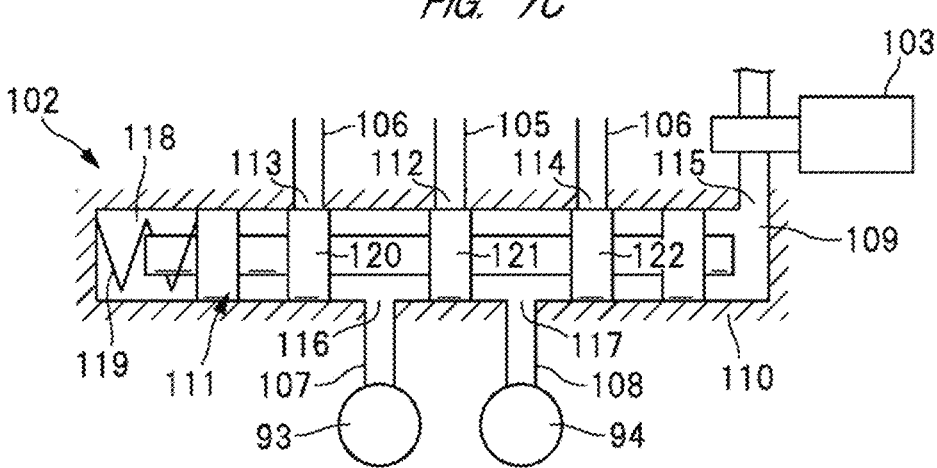
FIG. 7C is a diagram illustrating the operating state of the lock-up control valve.

FIG. 7A, FIG. 7B, and FIG. 7C are diagrams illustrating the operating state of the lock-up control valve 102. As illustrated in FIG. 7A, the lock-up control valve 102 includes a valve housing 110 having multiple ports and a spool valve stem 111 contained in the valve housing 110. The valve housing 110 has a supply port 112 coupled to the supply oil path 105, discharge ports 113 and 114 coupled to the discharge oil path 106, and a pilot port 115 coupled to the duty control valve 103. The valve housing 110 has an apply port 116 coupled to the apply oil path 107 and a release port 117 coupled to the release oil path 108.

The spool valve stem 111 having multiple valve bodies 120, 121, and 122 is contained so as to be movable in the valve housing 110. The pilot chamber 109 is defined between one end of the spool valve stem 111 and the valve housing 110, and a spring chamber 118 is defined between the other end of the spool valve stem 111 and the valve housing 110. A return spring 119 is attached in the spring chamber 118, and the return spring 119 biases the spool valve stem 111 toward an engagement position to be described later.

Engaging Operation State of Lock-Up Control Valve

As illustrated in FIG. 7A, the control system 60 controls the lock-up control valve 102 to be in an engaging operation state when engaging the lock-up clutch 90. In other words, the control system 60 reduces the duty ratio of the duty control valve 103 to reduce the pilot pressure, thereby moving the spool valve stem 111 to the engagement position by the spring force of the return spring 119 (in the direction of an arrow a). By thus moving the spool valve stem 111 to the engagement position, the supply oil path 105 and the apply oil path 107 are coupled, and the discharge oil path 106 and the release oil path 108 are coupled. Thus, as indicated by an arrow FL1 in FIG. 6, the working fluid is supplied to the apply chamber 93 and the working fluid is discharged from the release chamber 94, so that the lock-up piston 91 comes into contact with the front cover 95, and the lock-up clutch 90 is controlled to be in the engaged state.

Disengaging Operation State of Lock-Up Control Valve

In contrast, as illustrated in FIG. 7B, the control system 60 controls the lock-up control valve 102 to be in a disengaging operation state when disengaging the lock-up clutch 90. In other words, the control system 60 increases the duty ratio of the duty control valve 103 to increase the pilot pressure, thereby moving the spool valve stem 111 to the disengagement position against the spring force of the return spring 119 (in the direction of an arrow B). By thus moving the spool valve stem 111 to the disengagement position, the supply oil path 105 and the release oil path 108 are coupled, and the discharge oil path 106 and the apply oil path 107 are coupled. Thus, as indicated by an arrow FL2 in FIG. 6, the working fluid is supplied to the release chamber 94 and the working fluid is discharged from the apply chamber 93, so that the lock-up piston 91 comes out of contact with the front cover 95, and the lock-up clutch 90 is controlled to be in the disengaged state.

Oil Path Shut-Off State of Lock-Up Control Valve

FIG. 7C illustrates an oil path shut-off state of the lock-up control valve 102. As illustrated in FIG. 7C, the spool valve stem 111 can be stopped at an intermediate position between the engagement position and the disengagement position by controlling the duty ratio of the duty control valve 103 to adjust the pilot pressure. By thus moving the spool valve stem 111 to be stopped at the intermediate position, the discharge port 113 is shut off by the valve body 120, the supply port 112 is shut off by the valve body 121, and the discharge port 114 is shut off by the valve body 122. In other words, by stopping the spool valve stem 111 at the intermediate position, the apply oil path 107 is shut off by the spool valve stem 111, and the release oil path 108 is shut off by the spool valve stem 111. At this time, the lock-up clutch 90 is controlled to be in the neutral state between the engaged state and the disengaged state, and the torque capacity of the lock-up clutch 90 is controlled to almost "0 [Nm]".

As described above, by stopping the spool valve stem 111 at the intermediate position, that is, by controlling the lock-up control valve 102 to be in the oil path shut-off state, it is possible to stop the supply of working fluid to the apply chamber 93 and the release chamber 94. Thus, since it is possible to reduce the amount of working fluid consumed by the lock-up clutch 90, the load of the oil pumps 41 and 43 that eject the working fluid can be reduced. This oil path shut-off state of the lock-up control valve 102 is implemented when the engine 12 is in the stopped state and the vehicle speed is below a predetermined threshold V2, that is, when the amount of working fluid ejected by the oil pumps 41 and 43 decreases. Thus, the power unit 14 can be appropriately controlled without causing a shortage of working fluid even in a situation where the amount of working fluid ejected by the oil pumps 41 and 43 decreases. In other words, since the load of the oil pumps 41 and 43 can be reduced by controlling the lock-up control valve 102 to be in the oil path shut-off state, it is possible to achieve the size reduction and cost reduction of the pumps 41 and 43.

As described above, when the lock-up control valve 102 is controlled to be in the oil path shut-off state, the flow rate of working fluid supplied to the torque converter 26 is reduced as compared with the case where the lock-up control valve 102 is controlled to be in the engaging operation state. In other words, when the spool valve stem 111 is moved to the intermediate position, the flow rate of working fluid supplied to the torque converter 26 is reduced as compared with the case where the spool valve stem 111 is moved to the engagement position. When the lock-up control valve 102 is controlled to be in the oil path shut-off state, the flow rate of working fluid supplied to the torque converter 26 is reduced as compared with the case where the lock-up control valve 102 is controlled to be in the disengaging operation state. In other words, when the spool valve stem 111 is moved to the intermediate position, the flow rate of working fluid supplied to the torque converter 26 is reduced as compared with the case where the spool valve stem 111 is moved to the disengagement position. Note that controlling the lock-up control valve 102 to be in the oil path shut-off state to reduce the amount of working fluid consumed by the lock-up clutch 90 is referred to also as an oil amount balance improvement lock-up control. That is, a flow rate of the working fluid supplied to the torque converter 26 when the spool valve stem 111 is moved to the intermediate position is less than a flow rate of the working fluid supplied to the torque converter 26 when the spool valve stem 111 is moved to the engagement position. The flow rate of working fluid supplied to the torque converter 26 when the spool valve stem 111 is moved to the intermediate position is less than a flow rate of working fluid supplied to the torque converter 26 when the spool valve stem 111 is moved to the disengagement position.

Lock-Up Learning Control

In order to accurately stop the spool valve stem 111 at the intermediate position, the target duty ratio of the duty control valve 103 may be corrected as appropriate. Therefore, the control system 60 regularly learns the relationship between the disengagement timing of the lock-up clutch 90 and the actual duty ratio given to the duty control valve 103. For example, the relationship between the disengagement timing of the lock-up clutch 90 and the actual duty ratio can be learned by executing a learning mode of disengaging the lock-up clutch 90 immediately before stopping the vehicle, while maintaining the engine 12 in the driven state.

When the control system 60 has learned the relationship between the disengagement timing and the actual duty ratio, the control system 60 corrects the target duty ratio when controlling the lock-up control valve 102 to be in the oil path shut-off state based on the result of learning the disengagement timing and the actual duty ratio. For example, if the actual duty ratio for the disengagement timing has decreased compared with the previous value, the target duty ratio when controlling the lock-up control valve 102 to be in the oil path shut-off state is corrected toward the decreasing side. Meanwhile, if the actual duty ratio for the disengagement timing has increased compared with the previous value, the target duty ratio when controlling the lockup control valve 102 to be in the oil path shut-off state is corrected toward the increasing side.

When the lock-up clutch 90 is in the engaged state, the differential rotation between the engine rotation speed and the turbine rotation speed is "0". When the lockup clutch 90 is in the disengaged state, the differential rotation between the engine rotation speed and the turbine rotation speed increases beyond a predetermined threshold. Thus, the control system 60 detects the disengagement timing of the lock-up clutch 90 based on the differential rotation between the engine rotation speed and the turbine rotation speed.

Input Clutch Control in Ev Mode

As illustrated in FIG. 4A, since the engine 12 in the stopped state is disconnected from the wheels 18 in the EV mode, the input clutch 25 is controlled to be in the disengaged state. However, the control system 60 controls the input clutch 25 to be in the engaged state in preparation for the switching from the EV mode to the HEV mode when the vehicle speed is below a predetermined threshold V1 even in the EV mode in which the engine 12 is stopped.

For example, when the accelerator pedal is depressed heavily in the EV mode in which the vehicle speed is below the threshold V1, the engine 12 may be quickly started to engage the input clutch 25 in order to switch the driving mode from the EV mode to the HEV mode. Here, in order to reduce the engagement shock of the input clutch 25, the input clutch 25 may be switched to the engaged state while synchronizing the turbine rotation speed on the clutch input side with the primary rotation speed on the clutch output side.

However, at a low vehicle speed in the EV mode, the primary rotation speed may be low enough to fall below the idling rotation speed of the engine 12. When the engine 12 is started under a condition where the primary rotation speed is low as described above, the engine rotation speed that revs up will greatly exceed the primary rotation speed, which may cause the engagement shock of the input clutch 25. Thus, when the driving mode is the EV mode in which the engine 12 is stopped and the vehicle speed is below the threshold value V1, the control system 60 may engage the input clutch 25 in advance in preparation for the switching to the HEV mode. When the input clutch 25 is engaged in the EV mode, a differential rotation occurs between the engine rotation speed and the turbine rotation speed, but this differential speed is absorbed by the torque converter 26, which is a sliding element.

Engine Start Control

Figure 8:
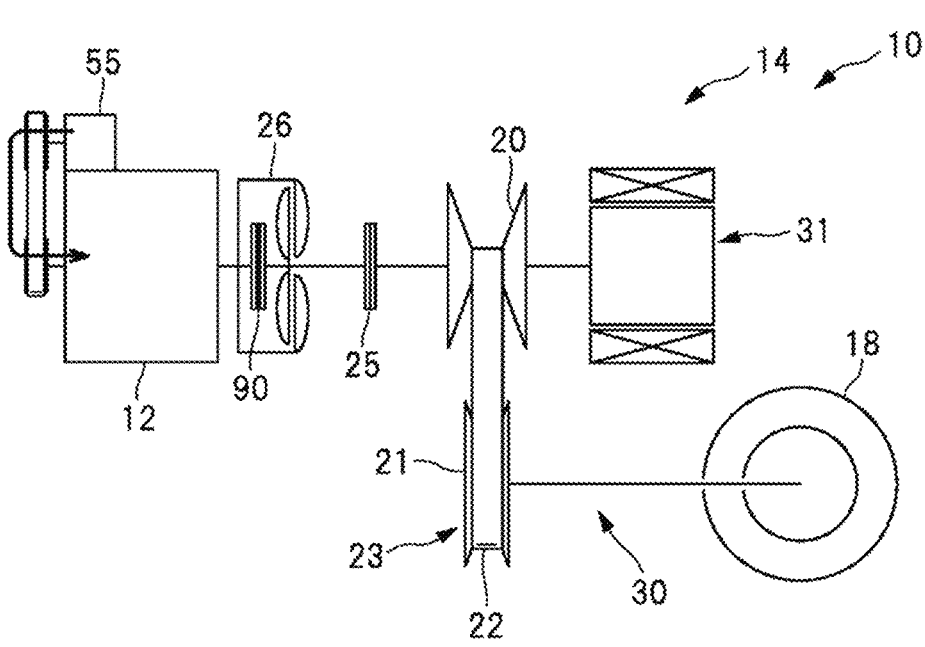
FIG. 8 is a diagram illustrating an engine starting state when switching from the EV mode to the HEV mode.

Subsequently, an engine start control when switching from the EV mode to the HEV mode will be described. FIG. 8 is a diagram illustrating an engine starting state when switching from the EV mode to the HEV mode. As described above, the control system 60 controls the input clutch 25 to be in the engaged state in preparation for the switching to the HEV mode when the driving mode is the EV mode in which the engine 12 is stopped and the vehicle speed is below the threshold V1. Also, as described above, the control system 60 controls the lock-up control valve 102 to be in the oil path shut-off state when the engine 12 is in the stopped state and the vehicle speed is below the threshold V2, that is, when the ejection amount of the oil pumps 41 and 43 decreases. At this time, the torque capacity of the lock-up clutch 90 is controlled to "0 [Nm]".

For example, as illustrated in FIG. 8, depending on the driving conditions of the vehicle 11, the engine 12 may be cranked by the starter generator 55 in the state where the input clutch 25 is controlled to be in the engaged state and the torque capacity of the lock-up clutch 90 is controlled to "0 [Nm]". At this time, if the spool valve stem 111 of the lock-up control valve 102 is deviated from the intermediate position toward the engagement position side and the torque capacity of the lock-up clutch 90 increases from "0 [Nm]", the engine start may be difficult due to the increase in the required cranking torque. Thus, the control system 60 starts the engine 12 by executing the following engine start control.

Figure 9:
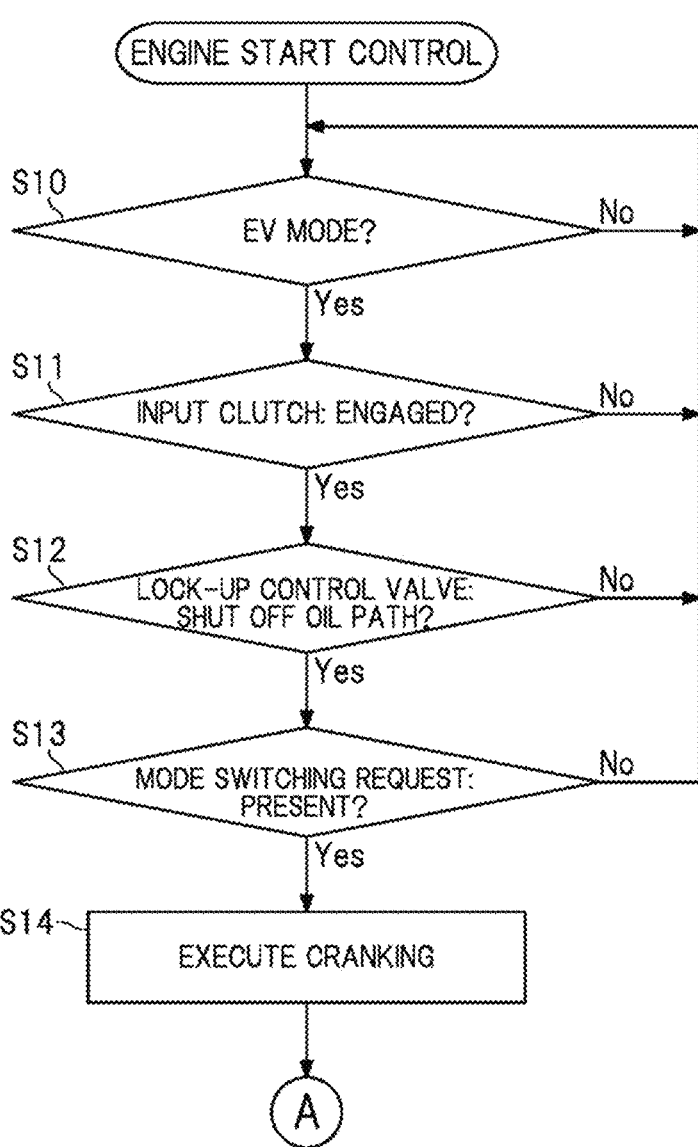
FIG. 9 is a flowchart illustrating an example of an execution procedure of an engine start control.
Figure 10:
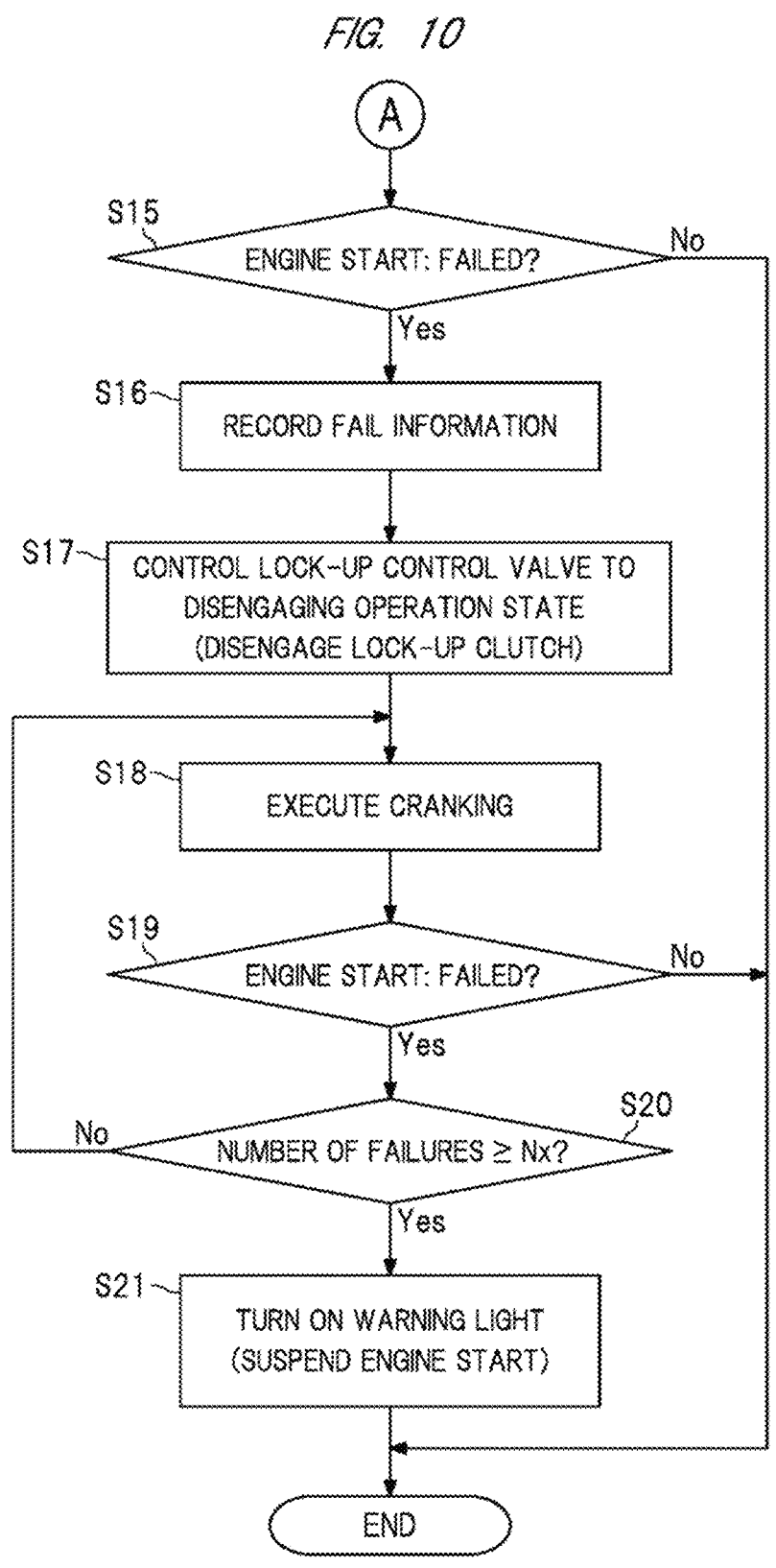
FIG. 10 is a flowchart illustrating the example of the execution procedure of the engine start control.

FIG. 9 and FIG. 10 are flowcharts illustrating an example of an execution procedure of the engine start control. The flowcharts in FIG. 9 and FIG. 10 are connected to each other at a point denoted by the reference sign A. Note that the steps of the engine start control illustrated in FIG. 9 and FIG. 10 are executed by the processor 70 in the control system 60. The engine start control is executed by the control system 60 at a predetermined cycle.

As illustrated in FIG. 9, the control system 60 causes the flow to proceed to step S10 and determines whether the EV mode is executed. When it is determined in step S10 that the EV mode is executed, the control system 60 causes the flow to proceed to step S11 and determines whether the input clutch 25 is engaged. When it is determined in step S11 that the input clutch 25 is engaged, the control system 60 causes the flow to proceed to step S12 and determines whether the lock-up control valve 102 is in the oil path shut-off state. When it is determined in step S12 that the lock-up control valve 102 is in the oil path shut-off state, the control system 60 causes the flow to proceed to step S13 and determines whether there is the mode switching request from the EV mode to the HEV mode.

When it is determined in step S13 that there is the mode switching request from the EV mode to the HEV mode, the control system 60 causes the flow to proceed to step S14 and causes the starter generator 55 to crank the engine 12. For example, the condition for cranking the engine 12 in step S14 is that the cranking by the starter generator 55 is started in the state where the input clutch 25 is controlled to be in the engaged state and the torque capacity of the lock-up clutch 90 is controlled to "0 [Nm]" as illustrated in FIG. 8. The cranking in step S14 corresponds to a first starting control in which the engine 12 is cranked in the state where the spool valve stem 111 is held at the intermediate position and the input clutch 25 is engaged.

As illustrated in FIG. 10, the control system 60 causes the flow to proceed to step S15 and determines whether the engine 12 is started by cranking. When it is determined in step S15 that the engine 12 is not started, that is, the engine start is failed, the control system 60 causes the flow to proceed to step S16 and records fail information indicating the failure to start the engine 12. Then, the control system 60 causes the flow to proceed to step S17 and controls the lock-up clutch 90 to be in the disengaged state by controlling the lock-up control valve 102 to be in the disengaging operation state. Further, the control system 60 causes the flow to proceed to step S18 and causes the starter generator 55 to crank the engine 12. The cranking in step S18 corresponds to a second starting control in which the engine 12 is cranked in the state where the spool valve stem 111 is moved to the disengagement position and the input clutch 25 is engaged.

Subsequently, the control system 60 causes the flow to proceed to step S19 and determines whether the engine 12 is started by cranking. When it is determined in step S19 that the engine 12 is not started, that is, the engine start is failed, the control system 60 causes the flow to proceed to step S20 and determines whether the number of times when the engine start is failed has reached a predetermined upper limit Nx (for example, three times). When it is determined in step S20 that the number of times when the engine start is failed has reached the upper limit Nx, the control system 60 causes the flow to proceed to step S21 and turns on the warning light 69 and suspends the engine start. Meanwhile, when it is determined in step S20 that the number of times when the engine start is failed has not reached the upper limit Nx, the control system 60 causes the flow to proceed to step S18 again and causes the starter generator 55 to crank the engine 12.

As described above, when the starting condition of the engine 12 is satisfied in the low vehicle speed region in the EV mode, the control system 60 performs the first starting control (step S14) in which the engine 12 is cranked in the state where the spool valve stem 111 is held at the intermediate position and the input clutch 25 is engaged. When the engine start by the first starting control is failed, the control system 60 performs the second starting control (step S18) in which the engine 12 is cranked in the state where the spool valve stem 111 is moved to the disengagement position and the input clutch 25 is engaged. Thus, even if the spool valve stem 111 of the lock-up control valve 102 is deviated from the intermediate position toward the engagement position side and the cranking torque required for the engine start increases, the engine 12 can be properly started by disengaging the lock-up clutch 90.

Target Value Correction Control

Figure 11:
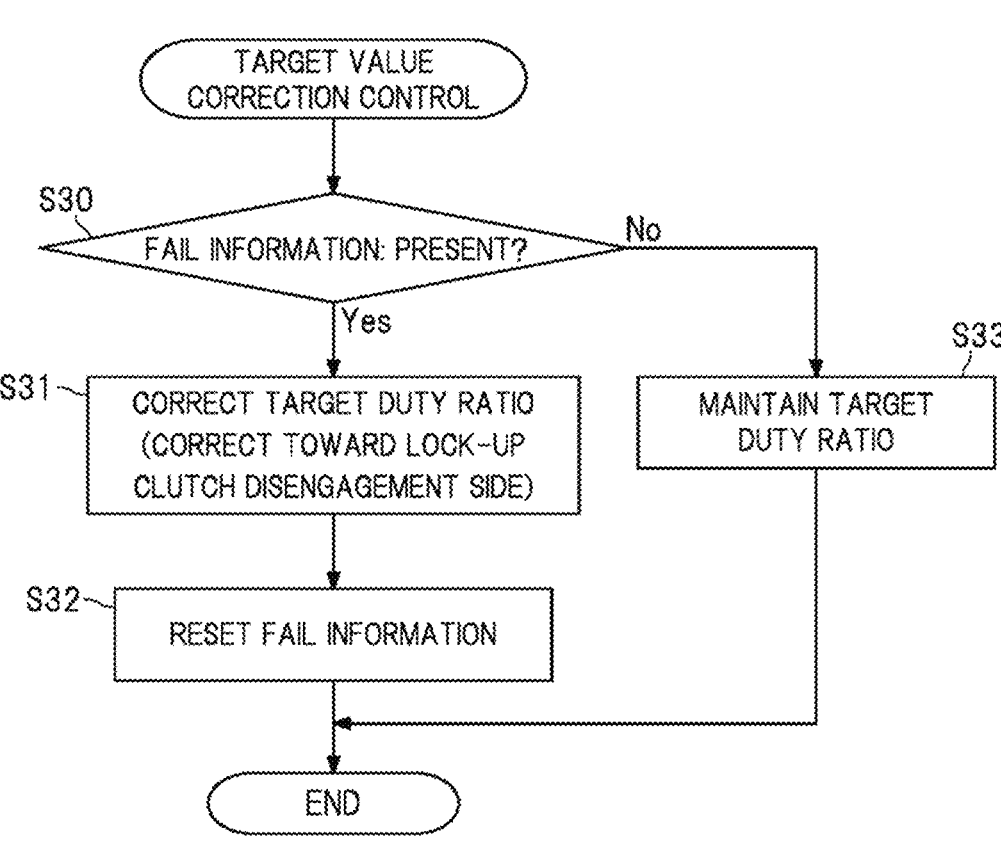
FIG. 11 is a flowchart illustrating an example of an execution procedure of a target value correction control.

As described above, one of the causes of engine start failure is that the target duty ratio of the lock-up control valve 102 is not set appropriately. Thus, the control system 60 corrects the target duty ratio of the lock-up control valve 102 by performing the following target value correction control. FIG. 11 is a flowchart illustrating an example of the execution procedure of the target value correction control. The steps of the target value correction control illustrated in FIG. 11 are executed by the processor 70 in the control system 60. The target value correction control is executed by the control system 60 at a predetermined cycle.

As illustrated in FIG. 11, the control system 60 causes the flow to proceed to step S30 and determines whether fail information indicating a start failure of the engine 12 is recorded. When it is determined in step S30 that the fail information is recorded, the control system 60 causes the flow to proceed to step S31 and corrects the target duty ratio toward the lock-up clutch disengagement side. In other words, since the illustrated duty control valve 103 has a structure in which the lock-up clutch 90 is engaged by reducing the duty ratio, the target duty ratio is corrected by adding a predetermined value to the target duty ratio. Then, after correcting the target duty ratio in step S31, the control system 60 causes the flow to proceed to step S32 and resets the fail information, and gets out of the routine. On the other hand, when it is determined in step S30 that no fail information is recorded, the control system 60 causes the flow to proceed to step S33, and gets out of the routine while maintaining the target duty ratio.

As described above, since one of the causes of engine start failure is a deviation in the target duty ratio, the control system 60 corrects the target duty ratio based on the fail information. This makes it possible to appropriately set the target duty ratio when moving the spool valve stem 111 to the intermediate position, and to appropriately control the lock-up control valve 102 to be in the oil path shut-off state. Thus, the power unit 14 can be appropriately controlled without causing a shortage of working fluid even in a situation where the amount of working fluid ejected by the oil pumps 41 and 43 decreases.

Modifications

The disclosure is not limited to the above-mentioned embodiment, and various modifications are possible within the range not departing from the gist of the disclosure. In the above description, the motor generator 31 is provided in the power unit 14, but the disclosure is not limited to this, and the motor generator 31 may be omitted from the power unit 14. In other words, even if the vehicle has only the engine 12 as a power source, the technique of the disclosure can be effectively applied as long as the vehicle starts the engine 12 when it is stopped or traveling at a low speed. In the above description, the control system 60 includes multiple electronic control units 36, 38, 44, 56, and 61, but the disclosure is not limited to this, and the control system 60 may include one electronic control unit.

In the example illustrated in FIG. 7C, both the apply oil path 107 and the release oil path 108 are shut off by stopping the spool valve stem 111 of the lock-up control valve 102 at the intermediate position, but the disclosure is not limited to this. For example, if it is possible to reduce the flow rate of working fluid toward the torque converter 26, the apply oil path 107 may be opened and the release oil path 108 may be shut off, or the release oil path 108 may be opened and the apply oil path 107 may be shut off. If it is possible to reduce the flow rate of working fluid toward the torque converter 26, both the apply oil path 107 and the release oil path 108 may be opened without shutting off both the apply oil path 107 and the release oil path 108.

In the above description, the spool valve stem 111 of the lock-up control valve 102 is moved toward the engagement position by reducing the duty ratio of the duty control valve 103, but the disclosure is not limited to this. For example, the configuration in which the spool valve stem 111 of the lock-up control valve 102 is moved toward the engagement position by increasing the duty ratio of the duty control valve 103 is also possible. In the above description, the pilot lock-up control valve 102 controlled by the duty control valve 103 is used, but the disclosure is not limited to this, and a direct-acting lock-up control valve may be used. In the above description, the control system 60 performs duty control on the lock-up control valve 102, but the disclosure is not limited to this, and the operating state of the lock-up control valve 102 may be controlled by other control methods.

In the illustrated example, the continuously variable transmission mechanism 23 is provided in the power unit 14, but the disclosure is not limited to this, and an automatic transmission mechanism including a planetary gear or the like may be provided in the power unit 14. In the above description, the starter generator 55 is used to crank the engine 12, but the disclosure is not limited to this, and a starter motor dedicated to starting the engine may be used to crank the engine 12. In addition, the threshold V1 which is compared with the vehicle speed when the input clutch 25 is engaged and the threshold V2 which is compared with the vehicle speed when the lock-up control valve 102 is controlled to be in the oil path shut-off state may be the same value or may be different values from each other.

According to the disclosure, it is possible to start an engine.

The invention claimed is:

1. A vehicle control apparatus for a hybrid vehicle, the vehicle comprising:
   an engine coupled to wheels via a power transmission path;
   a clutch provided in the power transmission path;
   a torque converter provided in the power transmission path and disposed between the engine and the clutch;
   a lock-up piston contained in a case of the torque converter and configured to define an apply chamber and a release chamber in the case;

a lock-up control valve coupled to the apply chamber via an apply oil path and coupled to the release chamber via a release oil path; and
   a control system comprising a processor and a memory coupled so as to be communicable with each other, wherein
   a spool valve stem of the lock-up control valve is configured to move to an engagement position where working fluid is supplied to the apply oil path and the working fluid is discharged from the release oil path, a disengagement position where the working fluid is supplied to the release oil path and the working fluid is discharged from the apply oil path, and an intermediate position located between the engagement position and the disengagement position, and
   the control system is configured to
perform, when a starting condition of the engine is satisfied in a state where the spool valve stem is moved to the intermediate position and the clutch is engaged, a first starting control in which the engine is cranked in a state where the spool valve stem is held at the intermediate position and the clutch is engaged, and
perform, when a start of the engine by the first starting control fails, a second starting control in which the engine is cranked in a state where the spool valve stem is moved to the disengagement position and the clutch is engaged
   the intermediate position of the spool valve stem is a position where both the apply oil path and the release oil path are shut off.

2. The vehicle control apparatus according to claim 1, wherein
   a flow rate of the working fluid supplied to the torque converter when the spool valve stem is moved to the intermediate position is less than a flow rate of the working fluid supplied to the torque converter when the spool valve stem is moved to the engagement position, and
   the flow rate of working fluid supplied to the torque converter when the spool valve stem is moved to the intermediate position is less than a flow rate of working fluid supplied to the torque converter when the spool valve stem is moved to the disengagement position.

3. The vehicle control apparatus according to claim 1, wherein
   the control system engages the clutch when the engine is stopped and a vehicle speed of the vehicle is below a threshold.

4. The vehicle control apparatus according to claim 1, further comprising
   a driving motor coupled to the wheels.

* * * * *